(Model.)
J. C. CASHMAN.
Watch Case.
No. 236,550. Patented Jan. 11, 1881.
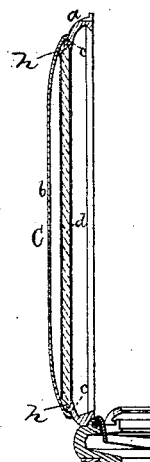
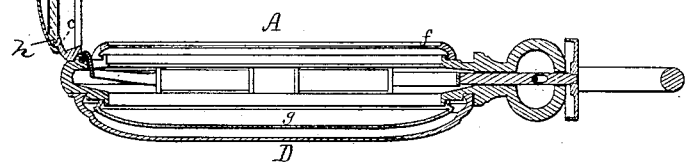
Fig. 1.
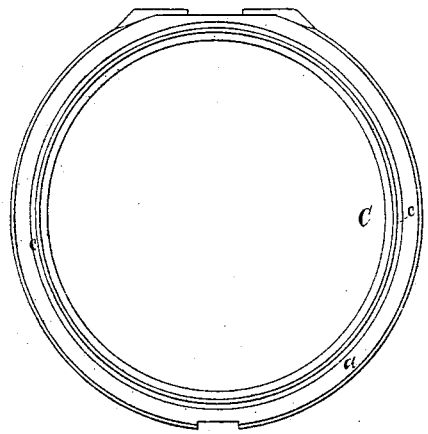
Fig. 2.
Fig. 3.
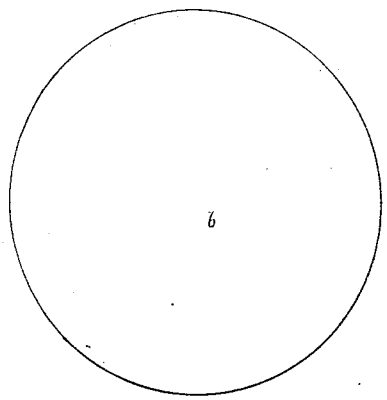
Fig. 4.
Fig. 5.
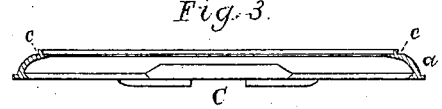
Witnesses.
S. N. Piper
W. W. Lunt
Inventor.
John C. Cashman.
by attorney
R. H. Eddy

UNITED STATES PATENT OFFICE.

JOHN C. CASHMAN, OF PITTSFIELD, NEW HAMPSHIRE.

WATCH-CASE.

SPECIFICATION forming part of Letters Patent No. 236,550, dated January 11, 1881.

Application filed October 27, 1880. (Model.)

*To all whom it may concern:*

Be it known that I, JOHN C. CASHMAN, of Pittsfield, of the county of Merrimack, of the State of New Hampshire, have invented a new and useful Improvement in Watch-Cases; and I do hereby declare the same to be described in the following specification and represented in the accompanying drawings, of which—

Figure 1 is a transverse section of a watch-case with one of its main back caps or covers open and provided with my invention. Fig. 2 is a top view, and Fig. 3 a transverse section, of the rabbeted ring or annulus; and Fig. 4 is a top view, and Fig. 5 a transverse section, of the concavo-convex disk composing the cap of the watch-case.

In the said Fig. 1 the body of the case is shown at A as rabbeted at $f$ to receive the crystal that usually covers the face and hands of the watch-works, and also as having an internal works-cover, $g$, and two external caps, backs, or covers, C D, these latter covers being hinged to the body, as usual.

My invention is for the purpose of enabling the external cap or cover, C or D, of the watch-case to have fixed within it a mirror or a picture—such as a photograph, for instance—and a glass disk or plate to cover such picture or photograph. To this end I compose either or each of the caps or covers C D of the watch-case A of a duplex rabbeted ring and a separate opaque disk, $b$, to fit into the outer rabbet of the ring, the inner rabbet being to receive a glass disk or mirror, to be kept in place therein by means of the outer disk.

A watch-case back or cover, as usually made, has an internal flange; but this constitutes no part of my invention, in the carrying out of which I make the ring $a$ of the cap with a rabbet, $c$, to extend around it in its upper part, as shown in Figs. 2 and 3, and with such ring I use a concavo-convex metallic or opaque disk or back, $b$, to fit tightly into the rabbet after there may have been placed therein a circular mirror, a picture, or a plate of glass and a picture to be covered by such plate. In Fig. 1 such a mirror is shown at $d$. The back $b$ may screw into the rabbet or be otherwise properly fixed therein. Besides the said rabbet, there is concentric with it an internal rabbet made in the cap or cover, as shown at $h$, such rabbet being to receive the mirror or glass disk $d$. The back may also be hinged to the rabbeted ring, and may be provided with a suitable catch or latch to hold it in place when down.

I claim—

In a watch-case, the combination of the ring $a$, provided with the internal and external rabbets, $c$ and $h$, with the glass plate or mirror inserted in the inner of said rabbets, and with the concavo-convex back $b$ disconnected from the body of the case and inserted in and held in place by the outer rabbet of the said ring, and serving as a cover to the glass plate or mirror, and with the rabbets to hold it in place in the ring when the latter is hinged to the body, all being substantially as set forth.

JOHN C. CASHMAN.

Witnesses:
R. H. EDDY,
S. N. PIPER.